United States Patent [19]

Mori

[11] 4,210,359
[45] Jul. 1, 1980

[54] SLIDING ROOF APPARATUS FOR VEHICLES

[75] Inventor: Keiji Mori, Toyota, Japan

[73] Assignee: Aisin Seiki Kabushiki Kaisha, Kariya, Japan

[21] Appl. No.: 900,859

[22] Filed: Apr. 28, 1978

[30] Foreign Application Priority Data

Apr. 30, 1977 [JP] Japan .................................. 52-50607

[51] Int. Cl.$^2$ ............................................. B60J 7/10
[52] U.S. Cl. ................................................... 296/222
[58] Field of Search .......... 296/137 E, 137 F, 137 G, 296/137 H

[56] References Cited

U.S. PATENT DOCUMENTS

| | | | |
|---|---|---|---|
| 3,031,226 | 4/1962 | Larche | 296/137 F |
| 3,290,087 | 12/1966 | Werner | 296/137 F |
| 3,610,682 | 10/1971 | Vermeulen | 296/137 H |
| 3,913,970 | 10/1975 | Jardin et al. | 296/137 H |
| 3,964,784 | 6/1976 | Prechter et al. | 296/137 E |

OTHER PUBLICATIONS

Ford Motor Co., 1975 Car Shop Manual vol. IV, Part 46-11.

*Primary Examiner*—Robert R. Song
*Attorney, Agent, or Firm*—Finnegan, Henderson, Farabow, Garrett & Dunner

[57] ABSTRACT

In a vehicle roof having a roof opening and a sliding panel for the roof opening, driving apparatus for the sliding panel including two rails mounted on the vehicle roof on each side of the panel for guiding the panel, shoe members engaging with each guide rail and provided on both sides of forward and rearward end portions of the sliding panel, a driving cable operatively connected to the rearward pair of shoe members for closing and opening the roof opening and a link member pivotally mounted between each rearward shoe and the panel and provided with an end tooth portion for frictional engagement with the guide rail. The tooth portion of the link member is engaged with the guide rail when the sliding panel is open, thereby preventing vibration of the sliding panel.

7 Claims, 3 Drawing Figures

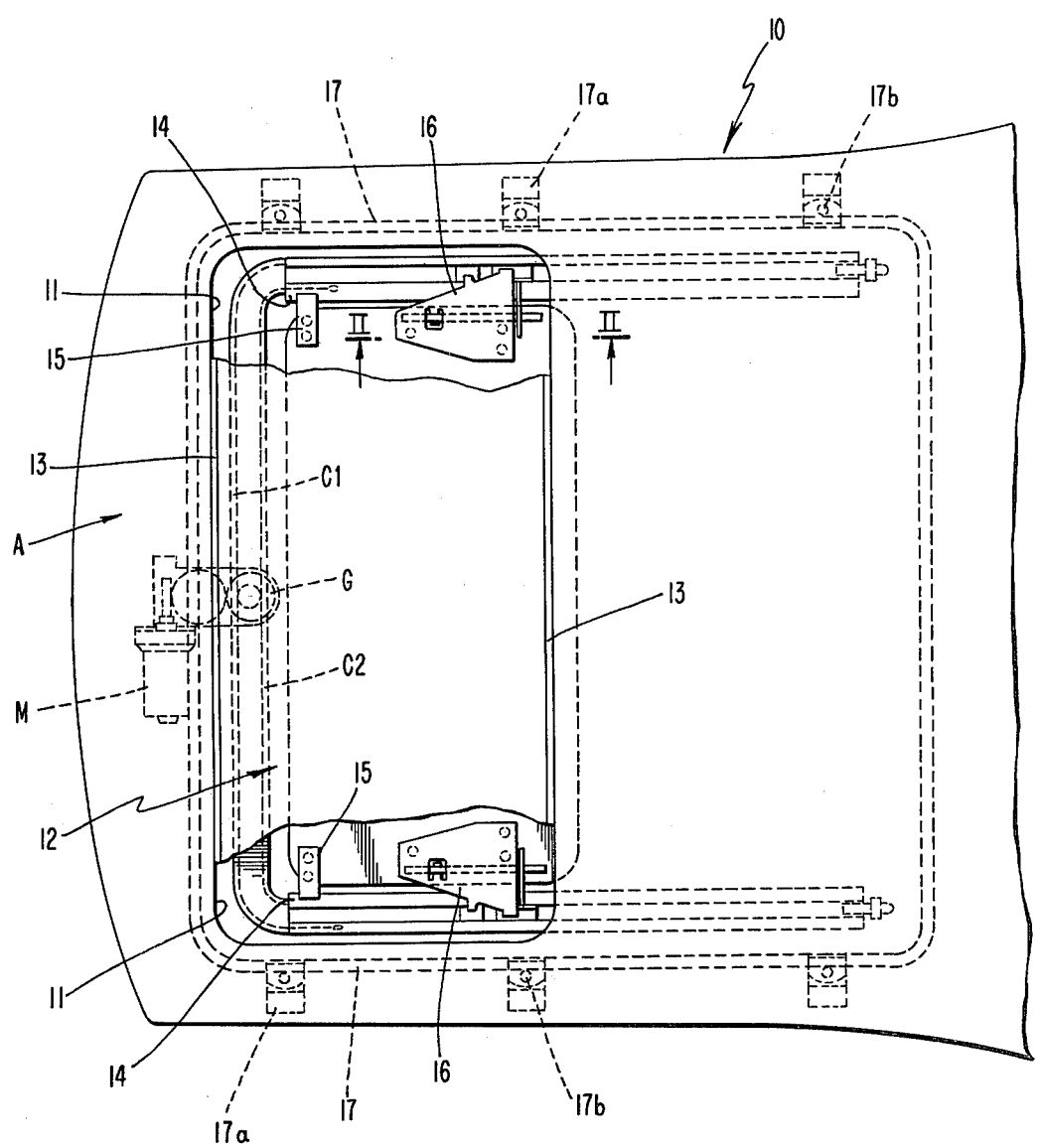

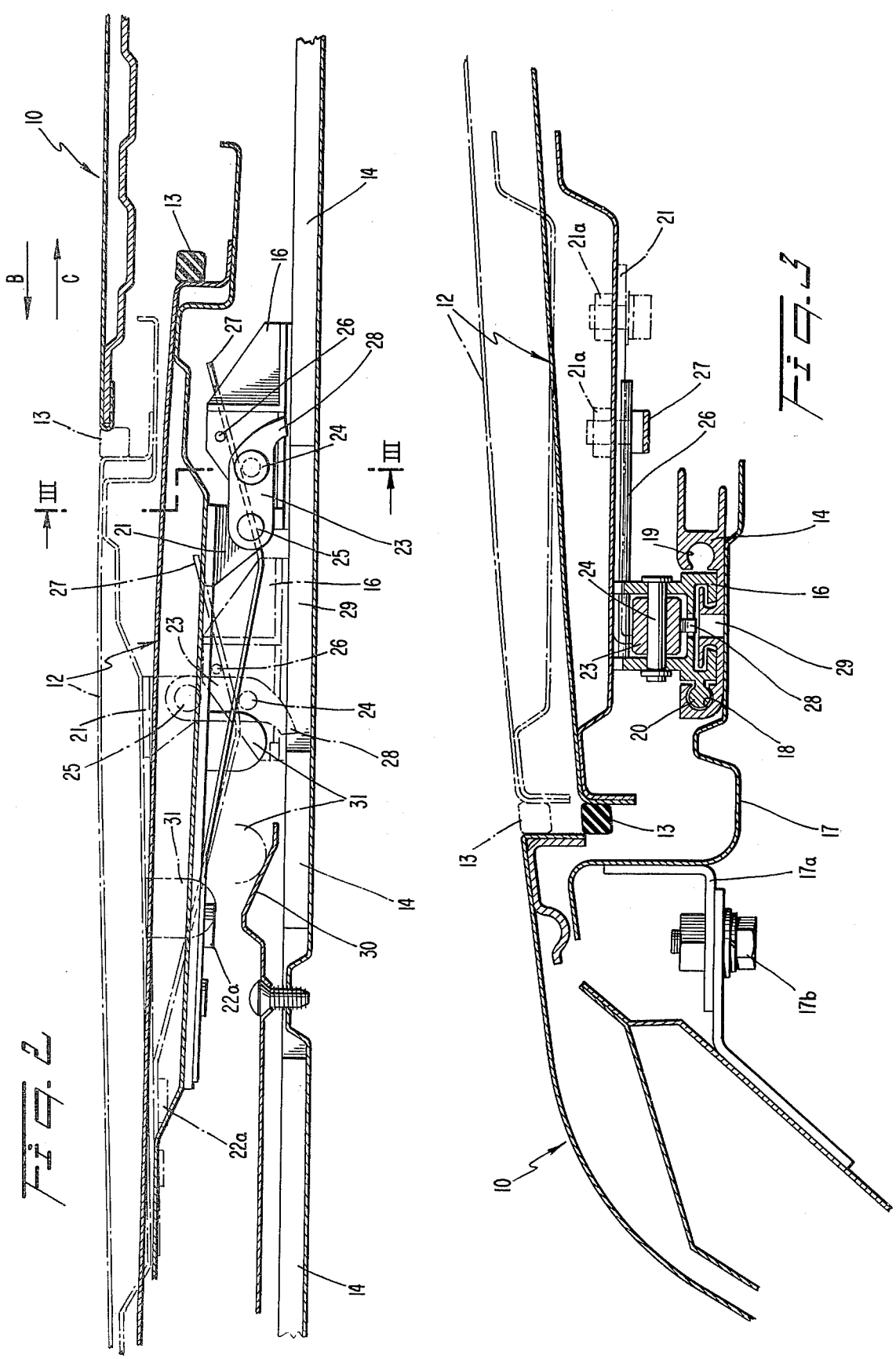

SLIDING ROOF APPARATUS FOR VEHICLES

BACKGROUND OF THE INVENTION

1. Field of the Invention

The present invention relates generally to a sliding roof apparatus for vehicles such as automobiles and more particularly to apparatus for preventing vibration of the sliding roof.

2. Background of the Invention

Generally, in automobiles having an opening in the roof, a sliding panel is provided for opening and closing the roof opening. The sliding panel slides horizontally in and out of the roof during opening and closing of the roof opening, besides being vertically lowered and raised as described below.

In a sliding roof for automobiles, the sliding panel is conventionally pressed downwardly by means of a spring in an attempt to prevent vibration in the sliding panel during running of the automobile while the roof opening is open and the sliding panel is housed in the roof. However, it is not practicable to provide a sufficient spring force to completely prevent vibration in the sliding roof. This is so because, when the spring force is increased or strengthened, the resistance of the spring force against the upward movement of the sliding panel becomes large. The upward movement of the sliding panel occurs at the final end of the closing stroke of the sliding panel. Accordingly, the reaction force is suddenly increased by the large spring force at the time of the upward movement of the closing stroke as compared with the force at the time the closing stroke was begun.

SUMMARY OF THE INVENTION

The present invention overcomes the aforementioned problems and disadvantages by providing a sliding roof apparatus having a vibration-preventing mechanism which permits opening and closing of the sliding roof while preventing vibration of the open sliding roof and eliminates the necessity of increasing the force of the spring conventionally used for preventing vibration.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the sliding roof apparatus of this invention comprises a sliding roof panel adapted to close and open a roof opening through horizontal and vertical movement of the panel, means mounted on the vehicle roof for guiding the sliding panel, means provided on the sliding panel for engaging the guiding means, means operably connected to the guide engaging means for driving the sliding panel to close and open the roof opening, and link means interposed between the sliding panel and the guide engaging means, the link means having an end tooth portion engaging the guiding means when the sliding panel is open for preventing vibration of the panel.

In a preferred form of the invention, the sliding roof apparatus includes spring means interposed between the sliding panel and the guide engaging means for urging the tooth portion of the link means into engagement with the guide means, base means fixedly attached to the sliding panel, and link means pivotally mounted between the base means and the guide engaging means. In a further preferred form of the invention, the guide means is provided with means defining an elongated hole therein for the tooth portion of the link means to rotate into when the tooth portion is not engaging the guide means.

Broadly, the sliding roof apparatus includes a sliding panel, a rail attached to the roof on each side of the panel for supporting and guiding the panel, forward and rearward shoes for engaging each rail, a link on each side pivotally mounted between the panel and the rearward shoes, and cable means for driving the panel along the rails. Each link includes an end tooth portion under the bias of a spring, for engaging the respective rails, when the panel is open, for preventing vibration of the panel.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIG. 1 is a plan view partially broken away showing an automobile vehicle roof having a sliding roof apparatus constructed in accordance with the present invention.

FIG. 2 is a longitudinal cross section taken along the line II—II in FIG. 1.

FIG. 3 is a side sectional view taken along the line III—III in FIG. 2.

DETAILED DESCRIPTION OF THE PREFERRED EMBODIMENT

Reference will now be made in detail to the present preferred embodiment of the invention, an example of which is illustrated in the accompanying drawings.

With particular reference to FIG. 1, a vehicle roof 10 is provided with a roof opening 11 located generally in the front portion A of the vehicle. A sliding panel 12 is moved horizontally and vertically for opening and closing roof opening 11. The sliding panel 12, as illustrated in FIG. 1, is in the closed position. The peripheral edge of sliding panel 12 is framed by a seal 13 made of any suitable elastic material such as rubber. This seal 13 fills the gap between the peripheral edge of sliding panel 12 and the peripheral edge of roof opening 11 for closing the roof opening, thereby sealing the opening and preventing the entry of rain, snow, and the like. The peripheral edges of roof 10 surrounding roof opening 11 are constructed, as well-known in the art, to facilitate a close-fitting sealed contact with the peripheral edges of sliding panel 12.

Sliding panel 12 is housed in the roof 10 upon opening, as is well-known in the art. In accordance with the invention, means are mounted on said vehicle roof for guiding the sliding panel during opening and closing. As embodied herein, the guiding means comprises a pair of guide rails 14. One of the pair of guide rails 14 is mounted on the vehicle roof 10 on each side of roof opening 11 by means of conventional fittings.

Further in accordance with the invention, means are provided on the sliding panel for engaging the guiding means. As embodied herein, the guide engaging means comprises a pair of forward shoe members 15 and a pair of rearward shoe members 16. More particularly, a forward shoe member 15 is mounted on each forward side of the sliding panel 12 and a rearward shoe member 16 is mounted on each rearward side of the sliding panel 12. Shoe members 15 and 16 are engaged with guide rails 14 to move slidably therealong, as more particularly described below.

Referring to FIG. 2, the forward end of each rail 14 is slightly sloped upward toward the roof 10 relative to the backward end of rails 14, and the forward end of the sliding panel 12 is raised along the uphill slope of the rail 14 at the end of the closing stroke of sliding panel 12.

The sliding panel 12 is moved horizontally in the direction B toward the front of the vehicle along guide rails 14 to close roof opening 11. Closing of the roof opening 11 is completed by raising sliding panel 12 vertically, as described below, into sealed contact with the peripheral edge of roof opening 11. Sliding panel 12 is housed within roof 10 when the roof opening is opened. Accordingly, when roof opening 11 is to be opened, sliding panel 12 is lowered vertically relative to the outer surface of roof 10 and then moved horizontally in the direction C into the body of roof 10.

Sliding panel 12, shown by the solid line configuration in FIG. 2, is in a partially opened or closed position and the sliding panel, as illustrated by the dotted line configuration in FIG. 2, shows the state in which the closing stroke of the sliding panel has been completed and roof opening 11 has been closed by the upward movement of the sliding panel.

Referring to FIG. 3, a housing 17 for supporting rails 14 is fixedly connected to roof 10, for example, by means of brackets 17a and bolts 17b. Housing 17 provides reinforcement for the portion of roof 10 defining roof opening 11.

Each rail 14 is provided with two substantially horizontal parallel grooves 18, 19, each having a substantially circular cross section, the groove 18, for example, being therefore on the outside of the rail, relative to the panel, on one side of the panel and on the inside of the rail on the other side of the panel. A projecting portion 20 of each rear shoe 16 is slidably located in the groove 18.

In accordance with the invention, the sliding roof apparatus includes means operably connected to the guide engaging means for driving the sliding panel to close and open the roof opening. As embodied herein, the driving means includes a drive motor M, shown in FIG. 1, located within the front portion A of roof 10. The driving means further includes a pair of flexible driving cables C1, C2. One end of each driving cable is connected to the portion 20 of each rearward shoe 16 which projects into the respective groove 18, the free end of each cable extending across the front end of the vehicle, through the drive gear G of the motor M, and into the open groove of the rail on the other side of the panel. Each cable is closely and slidably fitted into its grooves and is thus non-flexibly supported, enabling the cable to withstand stretching and compression loads. The whole lengthwise surface of the cable is provided with a spiral configuration, or screw threading, for engagement with the drive gear G. The cables move through rotation of the drive gear. The driving cables extended from shoes 16 are engaged, between their ends, with the drive gear of the motor M and are moved at the same time past each other in opposite directions by the single rotation of the one drive gear, as more particularly described in U.S. Pat. No. 3,290,087, which description is incorporated herein by reference.

In accordance with the invention, link means are interposed between the sliding panel and the guide engaging means, the link means having an end tooth portion engaging the guiding means when the sliding panel is open for preventing vibration of the panel. As embodied herein, the link means comprises a link 23 interconnecting a somewhat L-shaped base means and rearward shoe 16. The base means includes a base 21 fixedly connected at one end to the undersurface of sliding panel 12 by means of, for example, bolts 21a. The other end of base 21 projects down from the sliding panel 12 and is connected to link 23 by means of pivot pin 25. Link 23 is also connected to shoe 16 by means of a pivot pin 24. Link 23 has an end tooth portion 28 described below.

Further in accordance with the invention, spring means are interposed between the sliding panel and the guide engaging means for urging the tooth portion of the link means into engagement with the guide means. As embodied herein, the spring means comprises a leaf spring 27. A pin 26 projects from shoe 16 and one end of leaf spring 27 is frictionally and slidably engaged with the underside of pin 26. The other end of spring 27 is fixedly connected to the undersurface of base 21 by a pin 22a.

Spring 27 is frictionally and slidably engaged with pivot pin 24 and provides a downward bias on the sliding panel 12 through the pivot pin 25.

The end tooth portion 28 of link 23 is located at the opposite side of the link from the pin 25 for engaging rail 14. Rail 14 is provided with a narrow elongated hole 29 as shown in FIGS. 2 and 3. The construction and operation of the tooth portion 28 in conjunction with the elongated hole 29 will be described next.

Shoe 16 and the sliding panel 12 shown by the solid line configuration in FIG. 2 present the open state just before the sliding panel is vertically moved, as shown by the arrow B, in order to close the roof opening 11 of the roof 10. At this time tooth portion 28 of link 23 is still engaged with the upper surface of rail 14 as shown in solid line configuration in FIG. 2. When shoe 16 is moved leftwardly from this position, the free end of tooth portion 28 comes over the region of the elongated hole 29. Both pins 24 and 25 are arranged horizontally and the moment of rotation about the pin 24 does not act to pivot the link 23 even if the shoe 16 is moved farther to the left by the cables C1, C2.

A slope cam 30 of known design is fixed at the appropriate position on guide rail 14. A conventional cam-engaging member 31 for the cam is provided on sliding roof 12. When the sliding panel 12 approaches the end of the closing stroke, i.e, when the roof opening is approaching the fully closed position and the tooth portion 28 of link 23 is over the elongated hole 29, the cam and the cam-engaging member engage each other, thereby providing the force for upward movement of sliding panel 12. Accordingly, the horizontal arrangement of pins 24 and 25 is broken by the applied force and link 23 begins to rotate in a clockwise direction.

Thereafter, the rotation of link 23 is progressively increases by the vertical component of the force of the leftward stroke of shoe 16 and link 23 achieves a vertical position, as shown by the dotted line configuration of link 23 in FIG. 2. Simultaneously, as link 23 pivots to the vertical position, sliding panel 12 is moved upwardly, as shown by the dotted line configuration in FIG. 2, and sliding panel 12 sealingly engages roof 10 as described above, thereby closing roof opening 11.

Cam 30 and the cam-engaging member 31 are positioned such that they engage each other immediately after tooth portion 28 of link 23 enters the region of elongated hole 29. At the pivoting of link 23, therefore, the tooth end portion 28 enters the elongated hole 29. The exact positioning would be apparent to one of ordinary skill in the art. The upward movement of sliding panel 12 takes place despite the downward urging force of spring 27 described above.

When the closed roof opening 11 is to be opened, sliding panel 12 resists slightly the movement of shoe 16, even if shoe 16 is moved slightly rightwardly from the dotted line position shown in FIG. 2. Accordingly, the link 23 is immediately rotated in the counterclockwise direction in response to the resistance and sliding panel 12 is lowered. By this lowered movement of sliding panel 12, the sliding panel is disengaged from the closed state of the roof opening 11 and proceeds to follow the rightward movement of shoe 16. Consequently, the sliding panel 12 is drawn into roof 10 and roof opening 11 is opened. The lowering movement of sliding panel 12 is assisted by the downward urging force of spring 27 described above.

Link 23 cannot be rotated in the clockwise direction while tooth portion 28 is engaged with the upper surface of rail 14, as clearly viewed from link 23 shown in solid line configuration in FIG. 2. Consequently, vibration of sliding panel 12 is prevented by the contact between tooth portion 28 and rail 14. Spring 27 provides an additional force for preventing vibration of the sliding panel 12.

Although the invention has been shown and described with reference to a specific embodiment, it should be noted that the invention is in no way limited to the details of the illustrated embodiment but changes and modifications may be made without departing from the scope of the appended claims.

What I claim is:

1. Apparatus in a vehicle roof for opening and closing a vehicle roof opening comprising a sliding roof panel adapted to close and open the roof opening through horizontal and vertical movement of the panel, means mounted on the vehicle roof for guiding the sliding panel, forward and rearward means provided respectively on the forward and rearward end portions of the sliding panel for engaging the guiding means, means operably connected to the guide-engaging means for driving the sliding panel to close and open the roof opening, and a link for pivotally mounting said rearward means on said slidable panel, the link having an end tooth portion engaging the guide means when the sliding panel is open for preventing vibration of the panel.

2. A vehicle roof opening apparatus as set forth in claim 1 wherein the guide means comprises a pair of guide rails mounted on the vehicle roof, one on each side of the roof opening.

3. A vehicle roof opening apparatus as set forth in claim 2 wherein the forward and rearward means comprises respectively a pair of forward shoe members and a pair of rearward shoe members for engaging the guide rails on both sides of forward and rearward end portions of the sliding panel.

4. A vehicle roof opening apparatus as set forth in claim 3 wherein the driving means comprises driving cable means operatively connected to the rearward shoe members.

5. A vehicle roof opening apparatus as set forth in claim 2 wherein each of said rails includes an elongated hole into which the tooth portion of the link rotates when the tooth portion is not engaging the respective rails.

6. A vehicle roof opening apparatus as set forth in claim 1 further including spring means interposed between the sliding panel and the rearward means for urging the tooth portion of the link into engagement with the guide means.

7. A vehicle roof opening apparatus as set forth in claim 1 further including base means fixedly attached to the sliding panel and wherein said link is pivotally attached to said base means.

* * * * *